May 19, 1970     M. HILMER     3,512,544

THERMODYNAMIC STEAM TRAP

Filed Nov. 1, 1967

INVENTOR.
MILTON HILMER
BY
*Davis, Hoxie, Faithfull & Hapgood*
ATTORNEYS

# United States Patent Office 3,512,544
Patented May 19, 1970

3,512,544
THERMODYNAMIC STEAM TRAP
Milton Hilmer, Quakertown, Pa., assignor to Sarco Company, Inc., Allentown, Pa., a corporation of New York
Filed Nov. 1, 1967, Ser. No. 679,847
Int. Cl. F16t 1/00
U.S. Cl. 137—183                                 3 Claims

ABSTRACT OF THE DISCLOSURE

In a thermodynamic steam trap comprising a housing defining a cavity, a sealing member within said cavity dividing the same into a flow chamber and a pressure chamber, said sealing member being slideably positioned within said cavity for movement toward and away from said pressure chamber, said sealing member being received within said cavity and being dimensioned so as to minimize clearance between the sealing member and the cavity, an inlet leading to said flow chamber and terminating in an inlet valve seat against which said sealing member is adapted to seat, at least one outlet leading from said flow chamber, and a pressure-retaining valve seat interposed between said chamber, said sealing member being adapted to seat simultaneously against both said valve seats, the improvement wherein the sealing member has aperture means adapted to provide communication between said chambers when said sealing member is raised off said valve seats but located so as to close said communication by said pressure-retaining valve seat when the sealing member is seated on said valve seats.

---

This invention relates to improvements in steam traps, and has to do particularly with the design of the sealing member in disc-type steam traps such as that described in U.S. Pat. No. 3,376,885, granted Apr. 9, 1968 and U.S. Pat. No. 2,817,353 granted Dec. 24, 1957.

Disc-type steam traps are conventionally provided with a cavity into which inlet and outlet passages open. The inlet passage usually opens centrally into the cavity, and is provided with an inlet valve seat against which a detached sealing member, usually disc-shaped, is adaped to seat. The outlet passage or passages usually begin adjacent the inlet passage and are surrounded by a pressure-retaining valve seat, often concentric with the inlet valve seat, disposed so that the sealing disc seats simultaneously against both valve seats, thereby separating the outlet passage from both the inlet passage and the remainder of the cavity. The sealing disc is adapted to lift off the valve seats or close upon them in accordance with changes in the forces acting on the disc. When such a steam trap is connected to a steam system, the pressure of the fluid entering the inlet passage pushes the disc upwardly and permits fluid flow from the inlet passage across the inlet valve seat and out of the outlet passage and out of the outlet connection of the trap. Simultaneously, a small amount of pressure is transmitted around the periphery of the disc into the portion of the cavity above the disc. As steam or the vapor of the fluid being passed enters the inlet passage the velocity of flow across the underside of the valve disc is very greatly increased causing a decrease in pressure on the underside of the disc and simultaneously causing a build-up of pressure near the periphery of the disc due to the rapid decrease in velocity as the steam impinges upon the wall of the cavity in which the disc is slideable. This increase in pressure at the periphery of the disc causes the pressure in the portion of the cavity above the disc to increase forcing the disc toward its seat. Simultaneously, the decrease in pressure under the disc also causes a force tending to close the disc. Commonly, in disc-type steam traps such as that described in the aforesaid copending application, the disc, which is imperforate, is loosely positioned within the cavity into which it fits, being somewhat smaller in diameter than the cavity, so that steam pressure generated in, or introduced into, the cavity can be readily communicated around the edges of the disc to that portion of the cavity overlying the disc. The disc is thus caused to reseat on the valve seats thereby shutting off the flow of fluid through the trap.

Thus, disc-type traps are opened and closed by the balances of forces acting above and below the disc. The forces acting above the disc tend to be uniformly distributed because there is negligible motion within that portion of the cavity. The forces acting beneath the disc, however, are related to the flow of fluid, and tend not to be so evenly distributed. Because of this uneven distribution of forces on the disc, and because steam is often violently generated within the cavity, the considerable lateral play between the periphery of the disc and the wall of the cavity can be a disadvantage in that lateral forces can cause the disc to hammer against the sides of the cavity, thus wearing the edges of the disc and interfering with proper seating of the disc. This hammering action in some cases is so severe as to wear a hole through the cap or covering member defining the cavity. However, some passageway which permits steam to enter the upper portion of the cavity is necessary for the proper working of the steam trap, and with a disc-type closure member, such as that disclosed in U.S. Pat. No. 3,376,885 and in 2,817,353 referred to in the former, the only passage by which steam can enter the upper portion of the cavity above the disc is the annular passageway around the periphery of the disc.

It is therefore desirable to minimize the possibility of lateral hammering or shuddering of the sealing member within the cavity, and it is one object of this invention to reduce such lateral hammering sufficiently to eliminate substantial metal disintegration and wear.

This object is accomplished by dimensioning the sealing member to fit snugly but slideably within the cavity, such that there is a minimum of lateral play between the periphery of the sealing member and the walls of the cavity. This provision, however, introduces the problem of how to permit steam to pass across the sealing member into the portion of the cavity above said member, this being essential to the working of the steam trap.

It is therefore a further object of this invention to provide a solution to the problem of steam entering the portion of the cavity above the sealing member, while at the same time providing a sealing member which fits snugly inside the cavity.

The essence of this invention is to provide a close-fitting sealing member with relatively unrestricted apertures located in such a way that the valve seats themselves close off the apertures when the sealing member is seated on the valve seats.

Accordingly, this invention provides a steam trap comprising a housing defining a cavity, a sealing member within said cavity dividing the same into a flow chamber and a pressure chamber, said sealing member being slideably positioned within said cavity for movement toward and away from said pressure chamber, said sealing member being dimensioned for snug reception within said cavity so as to minimize clearance between the sealing member and the cavity, an inlet leading to said flow chamber and terminating in an inlet valve seat against which said sealing member is adapted to seat, at least one outlet leading from said flow chamber, a pressure-retaining valve seat interposed between said chambers, said sealing member being adapted to seat simultaneously against both said valve seats, said sealing member having therethrough aperture means adapted to provide communication between said chambers when said sealing member is raised off said valve seats but located so as to be closed by said pressure-retaining valve seat when the sealing member is seated on said valve seats.

One embodiment of this invention is shown in the accompanying drawing, in which like numerals refer to like parts throughout the several views, and in which.

Figure 1:
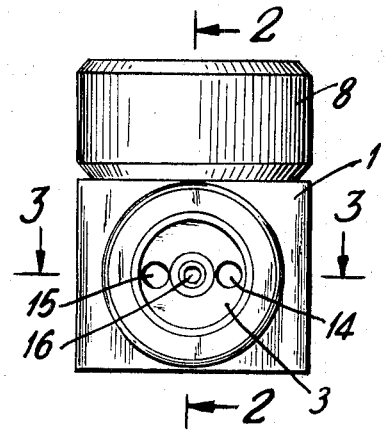
FIG. 1 is a lateral end-view of a thermodynamic steam trap.
Figure 2:
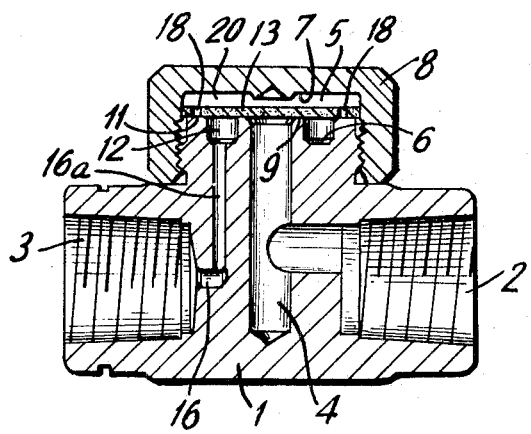
FIG. 2 is a sectional view of the steam trap of FIG. 1 taken at line 2—2.
Figure 3:
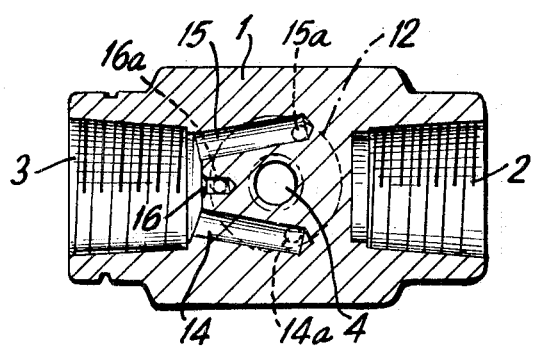
FIG. 3 is a sectional view of the steam trap shown in FIG. 1 taken at the line 3—3.

Turning to FIGS. 1, 2 and 3, it is seen that the steam trap has a main body 1 which has an inlet port 2 and an outlet port 3. The inlet port 2 is in commmunication with a vertically disposed inlet passage 4, which opens into a cavity 5 defined between the upper surfaces 6 of the valve body 1 and the undersurface 7 of a detachably secured cap member 8.

The upper surfaces 6 of the valve body 1 generally comprise an inner, circular valve seat 9 surrounding the inlet passage 4, an annular outlet channel 12, and an outer, circular, pressure-containing valve seat 11 surrounding the annular outlet channel 12. Overlying the valve seats 9 and 11 is a disc-shaped sealing member 13 which is slideably positioned within the cavity 5 for movement toward and away from the valve seats 9 and 11. The sealing member 13 is dimensioned for snug reception within the cavity 5, such that lateral movement of the sealing member 13 is substantially prevented, and clearance between the sealing member 13 and the cavity 5 is minimized.

It will be seen from FIGS. 1 and 3 that the outlet port 3 communicates with three conduits 14, 15 and 16 each of which has a vertical extension 14a, 15a, and 16a. These vertical extensions open into the outlet channel 12 at points spaced uniformly from one another, as shown in dotted lines in FIG. 3. By so positioning the vertical portions 14a, 15a, and 16a, a radially symmetrical flow pattern over the edge of valve seat 9 is assured when the sealing member 13 is raised off the valve seats 9 and 11. The horizontal conduits 14 and 15 are larger in diameter than the conduit 16, in order to assure that each conduit has substantially the same flow capability (i.e., the same resistance to flow).

Figure 4:
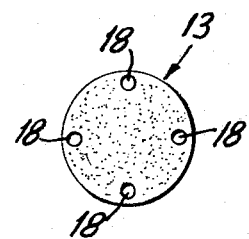
FIG. 4 is a plan view of the disc closure member utilized in the steam trap according to this invention.

Turning now to FIG. 4, the sealing member 13 is shown to include a plurality of apertures 18 located so as to be directly over the valve seat 11. Naturally, the number of apertures shown in FIG. 4 is entirely arbitrary, and can be either more or less, whichever is preferred for any specific application or size of aperture. Again, instead of the circular apertures shown, slots could be provided. It is desirable although not essential that the apertures in the sealing member 13 be substantially symmetrically distributed around the sealing member, in order to assure that steam passing across the sealing member 13 will not give rise to a moment about the center of the sealing member 13, since such a moment could cause the sealing member 13 to bind within the cavity 5.

In the appended claims, the cavity 5 is referred to as including a pressure chamber 20 which is located above the sealing member 13, and a flow chamber, the latter being the annular outlet channel 12.

It will be appreciated that the valve seats 9 and 11 are coplanar, such that the sealing member 13 can seat simultaneously on them. Alternatively, it is conceivable that the sealing member 13 could be stepped concentrically (or eccentrically), and one of the valve seats raised or lowered accordingly. It is essential, however, that the sealing member 13 seat itself simultaneously on the two valve seats 9 and 11.

It is not, of course, essential that there be provided three outlet passages 14, 15 and 16, since a single such passage will suffice for adequate operation of the steam trap. The provision of three passages, however, assures that a minimum moment will be applied to the sealing member 13 during the flow of steam.

In the embodiment shown in the drawings, no apertures are provided over the inlet valve seat 9, as it is considered that such apertures, being in a more or less direct line with the steam entering the cavity via the inlet port, would result in too rapid a closure of the disc on the valve seats.

Although the sealing member 13 is shown in the drawings to be a disc, it would be possible to use other shapes. Firstly, as mentioned above, a concentrically stepped member could be used if it were desired to situate the valve seats 9 and 11 in different planes. Secondly, it might be desired to make the upper surface of the member 13 convex or concave. Conceivably, the contour of the lower surface of the sealing member 13 could also be altered, provided the valve seats 9 and 11 were altered in the same way. Thirdly, the peripheral shape of the member 13 need not necessarily be circular, although circularity permits free rotation and thus more uniform wear.

As is apparent from the above description, the steam trap of the present invention operates in the manner of those of U.S. Pats. 3,376,885 and 2,817,353, which manner of operation is described above. In the aforementioned patented traps, the communication between the pressure chamber and the outlet passage is around the peripheral edge of the sealing member thereby necessitating a relatively great clearance between that edge and the cavity wall. In the present invention, that pressure is communicated through apertures 18 in sealing member 13. The communication of the pressure chamber and the outlet passage in the present invention and in the patented traps is terminated by closure of the sealing member against the outlet valve seat.

What is claimed is:

1. A thermodynamic steam trap comprising:
a housing defining a cavity,
a sealing member within said cavity dividing the same into a flow chamber and a pressure chamber, said sealing member being slideably positioned within said cavity for movement toward and away from said pressure chamber, said sealing member being dimensioned for snug reception within said cavity so as to minimize clearance between the sealing member and the cavity,
an inlet leading to said flow chamber and terminating in an inlet valve seat against which said sealing member is adapted to seat,
at least one outlet leading from said flow chamber,
and a pressure-retaining valve seat interposed between said chambers, said sealing member being adapted to seat simultaneously against both said valve seats, said sealing member having therethrough aperture means adapted to provide communication between said chambers when said sealing member is raised off said valve seats but located so that said communication is closed by said pressure-retaining valve seat when the sealing member is seated on said valve seats.

2. A thermodynamic steam trap as claimed in claim 1, in which said aperture means includes a plurality of apertures located directly over said pressure-retaining valve seat.

3. A thermodynamic steam trap as claimed in claim 1, in which said cavity is circular and said sealing member is a disc, said aperture means including a plurality of apertures located directly over the pressure-retaining valve seat and substantially symmetrically distributed around the sealing member.

References Cited

UNITED STATES PATENTS

| | | | |
|---|---|---|---|
| 2,234,387 | 3/1941 | Schott | 137—183 |
| 2,817,353 | 12/1957 | Midgette | 137—183 |
| 2,988,101 | 6/1961 | Mueller | 137—183 |
| 3,376,885 | 4/1968 | Cusi | 137—183 |

ROBERT G. NILSON, Primary Examiner